United States Patent

Amineh

(10) Patent No.: US 10,521,022 B2
(45) Date of Patent: Dec. 31, 2019

(54) MOBILE COMMUNICATION TERMINAL AND METHOD THEREFOR

(75) Inventor: Romel Amineh, Copenhagen (DK)

(73) Assignee: CONVERSANT WIRELESS LICENSING S.A.R.L., Luxembourg (LU)

( * ) Notice: Subject to any disclaimer, the term of this patent is extended or adjusted under 35 U.S.C. 154(b) by 348 days.

(21) Appl. No.: 11/384,210

(22) Filed: Mar. 17, 2006

(65) Prior Publication Data

US 2007/0216659 A1    Sep. 20, 2007

(51) Int. Cl.
| | |
|---|---|
| G06F 3/048 | (2013.01) |
| G06F 3/023 | (2006.01) |
| G06F 3/0488 | (2013.01) |
| H04M 1/23 | (2006.01) |
| H04M 1/2745 | (2006.01) |
| H04M 1/725 | (2006.01) |

(52) U.S. Cl.
CPC ........ *G06F 3/0236* (2013.01); *G06F 3/04886* (2013.01); *H04M 1/23* (2013.01); *H04M 1/2745* (2013.01); *H04M 1/72558* (2013.01); *H04M 2250/22* (2013.01)

(58) Field of Classification Search
CPC ............... G06F 3/0236; G06F 3/04886; G06F 3/04897; G06F 3/048; G06F 3/0482; G06F 3/0484
USPC .................................. 345/173, 168, 211, 169
See application file for complete search history.

(56) References Cited

U.S. PATENT DOCUMENTS

| | | | |
|---|---|---|---|
| 6,073,036 A * | 6/2000 | Heikkinen et al. | ........ 455/550.1 |
| 6,094,197 A | 7/2000 | Buxton et al. | |
| 6,278,887 B1 * | 8/2001 | Son et al. | ...................... 455/566 |
| 6,781,610 B2 | 8/2004 | Os et al. | |
| 6,927,763 B2 | 8/2005 | La Monica | |
| 7,424,683 B2 | 9/2008 | Van Leeuwen | |
| 7,616,191 B2 * | 11/2009 | Matta | ............................ 345/168 |
| 8,042,044 B2 | 10/2011 | Van Leeuwen | |
| 2002/0093539 A1 | 7/2002 | Os et al. | |
| 2003/0006967 A1 * | 1/2003 | Pihlaja | .......................... 345/168 |
| 2003/0011601 A1 | 1/2003 | Itoh et al. | |

(Continued)

FOREIGN PATENT DOCUMENTS

| | | |
|---|---|---|
| EP | 1 195 673 A1 | 4/2002 |
| JP | 2000-181608 A | 6/2000 |

(Continued)

OTHER PUBLICATIONS

Bibliographic Data for EP 1 195 673 A1, including English Abstract, 2 pages total.

(Continued)

*Primary Examiner* — Dennis P Joseph

(74) *Attorney, Agent, or Firm* — Borden Ladner Gervais LLP; Gail Silver

(57) ABSTRACT

An input method for a mobile communication apparatus, and such a mobile communication apparatus, which comprises a processor and a touch sensitive display, is disclosed. The invention particularly comprises displaying a touch keypad comprising a set of keys, detecting an object over one key of said set of keys, and displaying, upon detection of said object, a first sub-set of keys adjacent to said one key, wherein said sub-set of keys is associated with a first set of sub-functions of said one key.

27 Claims, 4 Drawing Sheets

(56) References Cited

U.S. PATENT DOCUMENTS

| | | | |
|---|---|---|---|
| 2003/0064757 A1 | 4/2003 | Yamadera et al. | |
| 2004/0155869 A1* | 8/2004 | Robinson et al. | 345/168 |
| 2004/0263479 A1 | 12/2004 | Shkolnikov | |
| 2005/0086611 A1 | 4/2005 | Takabe et al. | |
| 2005/0140659 A1* | 6/2005 | Hohl et al. | 345/169 |
| 2005/0140661 A1* | 6/2005 | Collins | 345/173 |
| 2005/0246652 A1 | 11/2005 | Morris | |
| 2006/0007178 A1* | 1/2006 | Davis | 345/173 |
| 2006/0022955 A1* | 2/2006 | Kennedy | G06F 3/0414 345/173 |
| 2006/0053387 A1* | 3/2006 | Ording | G06F 3/04883 715/773 |
| 2006/0161871 A1* | 7/2006 | Hotelling et al. | 715/863 |
| 2007/0046641 A1* | 3/2007 | Lim | 345/173 |
| 2007/0152980 A1* | 7/2007 | Kocienda et al. | 345/173 |

FOREIGN PATENT DOCUMENTS

| | | | |
|---|---|---|---|
| JP | 2002-041205 A | 2/2002 | |
| JP | 2002358162 A1 | 12/2002 | |
| JP | 2003016465 A | 1/2003 | |
| JP | 2003108280 A1 | 4/2003 | |
| JP | 2003-177848 A | 6/2003 | |
| JP | 2004021522 A | 1/2004 | |
| JP | 2004038894 A | 2/2004 | |
| JP | 2004206731 A1 | 7/2004 | |
| JP | 2004326189 A | 11/2004 | |
| JP | 2005092441 A | 4/2005 | |
| WO | 03062978 A | 7/2003 | |
| WO | 03098417 A2 | 11/2003 | |
| WO | 2004051392 A2 | 6/2004 | |
| WO | 2005101177 A1 | 10/2005 | |

OTHER PUBLICATIONS

English Abstract of JP2005092441, 1 page.
English Abstract of JP2003108280, 1 page.
English Abstract of JP2004021522, 1 page.
English Abstract of JP2004038894, 1 page.
English Abstract of JP2002358162, 1 page.
English Abstract of JP2004206731, 1 page.
English Abstract of Japanese Publication No. 2004-326189, published Nov. 18, 2004, Sony Corp. (2 pages).
English Abstract of Japanese Publication No. 2003-016465, published Jan. 17, 2003 IBM (2 pages).
English Translation of Japanese Office Action dated Jun. 4, 2013 (5 pages).

* cited by examiner

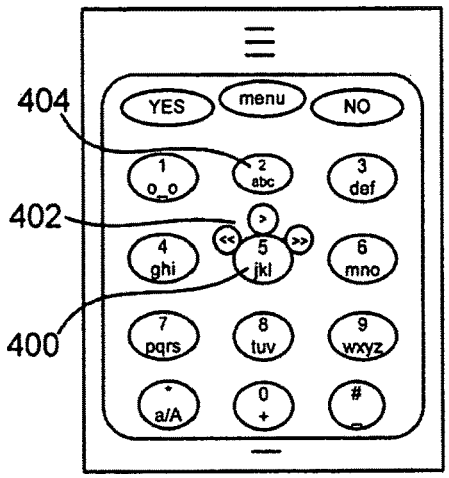
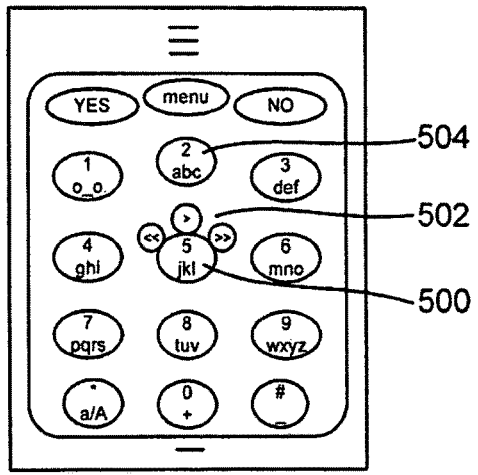
Fig. 4          Fig. 5
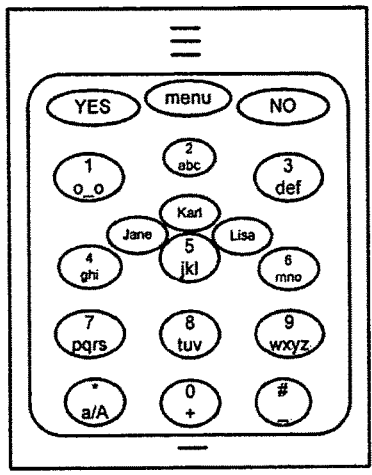
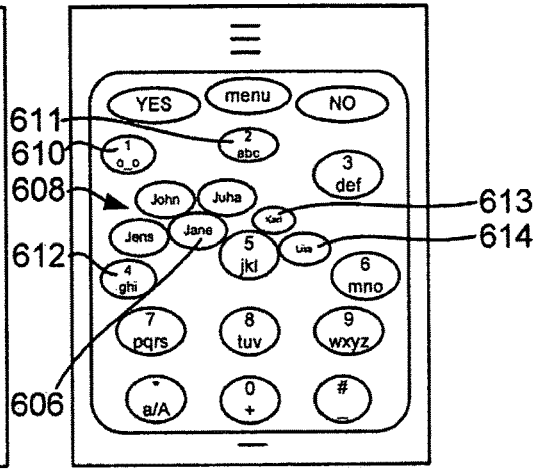
Fig. 6a         Fig. 6b
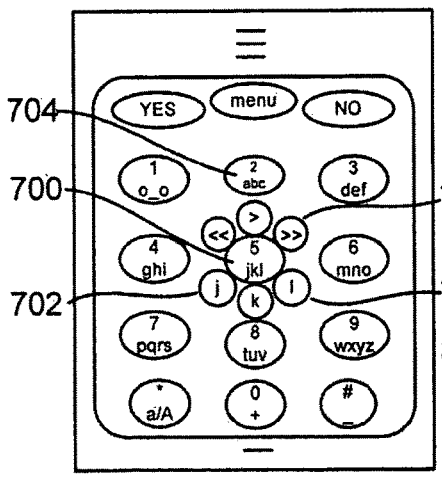
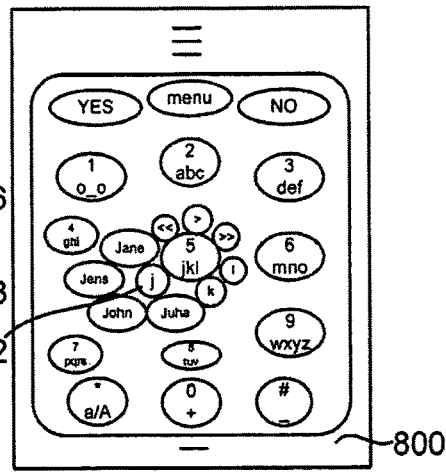
Fig. 7          Fig. 8

MOBILE COMMUNICATION TERMINAL AND METHOD THEREFOR

TECHNICAL FIELD

Embodiments of the present invention relates to a mobile communication apparatus with an improved user interface, and an input method for a mobile communication apparatus.

BACKGROUND OF THE INVENTION

A problem with mobile communication apparatuses, which nowadays comprise a huge number of functions, is that a large number of functions are to be controlled with a very limited number of input means, i.e. keys, rotating input means, joystick, etc. This is normally coped with by using a menu system, where functions are accessed by navigating a menu system, normally hierarchical. However, for functions that are used often, and especially when a plurality of functions is to be operated in sequence, the menu approach is not satisfactory for the user. An example of this is text input. In this case, multitap or predicting functions have been used, but still, there is a need for improvements, since the existing solutions are error prone. This may be solved, as in US 2005/0140659 A1, with a keypad comprising a number of ordinary keys and a number of extra keys, wherein the extra keys will get an adaptive function depending on actuation of the ordinary keys. This is used for text input, such that when e.g. the ordinary key for "2" is pressed, wherein the key for "2" also comprises alphanumeric symbols "a", "b", and "c", the extra keys will get the function of "a", "b", and "c", respectively. In this way, the user can easily select what alphanumeric symbol to be input. However, this approach is still not satisfactory for a number of reasons, e.g. the extra keys will take up precious space on the keypad when they are not used, the user has to move between the ordinary key set and the extra key set for each input, etc.

Therefore, there is a need for an improved way of input and activation of functions.

SUMMARY OF THE INVENTION

In view of the above, an objective of embodiments of the invention is to solve or at least reduce the problems discussed above. In particular, an objective is to provide an intuitive and efficient user interface and input approach for mobile communication apparatus.

According to a first aspect of the present invention, there is provided a mobile communication apparatus comprising a processor and a touch sensitive display, wherein said touch sensitive display is arranged to, under control of said processor, display a touch keypad, comprising a set of keys, detect an object over one key of said set of keys, and display, upon detection of said object over said one key, a first sub-set of keys associated with a first set of sub-functions of said one key, wherein said sub-set of keys is arranged adjacent to said one key.

An advantage of this is that the sub-set of keys are arranged in direct vicinity to the first actuated key, and therefore the user can actuate the key associated with the sub-function both quickly and intuitively.

The touch sensitive display may further be arranged to, under control of said processor, detect an object over one key of said first sub-set of keys, and display, upon detection of said object over said one key of said first sub-set of keys, a second sub-set of keys associated with a second set of sub-functions of said one key of said first sub-set of keys, wherein said second sub-set of keys is arranged adjacent to said one key of said first sub-set of keys.

This way, the user is able to select among a larger number of functions in a structured way, which maintains the intuitivity of the handling of the mobile communication apparatus, although the number of functions is large.

The second set of sub-functions may relate hierarchically to one sub-function of said first set of sub-functions.

This improves the user's experience of the intuitive handling.

The first set of sub-functions may relate to a first application of said mobile communication apparatus and said second set of sub-functions may relate to a second application of said mobile communication apparatus.

This way, the user is able to select what application that is to be accessed directly from the keypad, without the need of first choosing this from a menu system.

The first set of sub-functions may be application dependent. The second set of sub-functions may also be application dependent. The first sub-set of keys associated with a first set of sub-functions of said one key may comprise a first group of keys associated with sub-functions related to a first application, and a second group of keys associated with sub-functions related to a second application. Also, the second sub-set of keys associated with a second set of sub-functions of said one key of said first sub-set of keys may comprise a first group of keys associated with sub-functions related to a first application, and a second group of keys associated with sub-functions related to a second application.

This enables a more specific presentation of sub-functions depending on the actual use of the mobile communication apparatus.

The touch sensitive display may further be arranged to, under control of said processor, move at least one neighbouring key to said one key of said set of keys on said touch sensitive display to make room for said first sub-set of keys. The touch sensitive display may further be arranged to, under control of said processor, move at least one neighbouring key to said one key of said first sub-set of keys on said touch sensitive display to make room for said second sub-set of keys. The touch sensitive display may further be arranged to, under control of said processor to scale down at least one neighbouring key to said one key of said set of keys on said touch sensitive display to make room for said first sub-set of keys. The touch sensitive display may further be arranged under control of said processor to scale down at least one neighbouring key to said one key of said first sub-set of keys on said touch sensitive display to make room for said second sub-set of keys.

An advantage of this is that the mobile communication apparatus automatically makes room for the extra keys, such that they can be in direct vicinity of the first actuated key. This is enabled due to the adaptiveness of the nature of the touch keypad provided by the touch sensitive display.

The touch sensitive display may be arranged to delay display of said first sub-set of keys until after a predetermined time of said detection.

This enables that unintentional actuation of keys does not render in annoying pop-ups of extra key sets. The predetermined time may be set by the user, pre-set, or adapted according to determined user interaction speed history.

The touch sensitive display may be arranged to display said first sub-set of keys for a predetermined time after said detection ceases.

This enables a user to determine and actuate a desired key of the sub-set of keys for a time, or, if the user do not want to activate any of the functions, the sub-set of keys disappears again. This improves the user-friendlyness. The pre-determined time may be set by the user, pre-set, or adapted according to determined user interaction speed history. The sub-functions may comprise alphanumeric input, mediaplayer input, short-cuts to applications, functions or contacts, or browser input, or any combination thereof.

The functions of the keys of the first set of keys, the first sub-set of keys, and the second sub-set of keys, respectively, are activated upon pressing a key. The object may be a finger, a stylus, or a digitizer pen.

According to a second aspect of the present invention, there is provided an input method for a mobile communication apparatus comprising a processor and a touch sensitive display, comprising the steps of:

displaying a touch keypad comprising a set of keys, detecting an object over one key of said set of keys, and displaying, upon detection of said object, a first sub-set of keys adjacent to said one key, wherein said sub-set of keys is associated with a first set of sub-functions of said one key.

The method may further comprise the steps of:

detecting an object over one key of said first sub-set of keys, and displaying, upon detection of said object, a second sub-set of keys adjacent to said one key of said first sub-set of keys, wherein said second sub-set of keys is associated with a second set of sub-functions of said one key of said first sub-set of keys.

The method may further comprise the step of moving at least one neighbouring key to said one key of said set of keys on said touch sensitive display to make room for said first sub-set of keys.

The method may further comprise the step of moving at least one neighbouring key to said one key of said first sub-set of keys on said touch sensitive display to make room for said second sub-set of keys.

The method may further comprise the step of scaling down at least one neighbouring key to said one key of said set of keys on said touch sensitive display to make room for said first sub-set of keys.

The method may further comprise the step of scaling down at least one neighbouring key to said one key of said first sub-set of keys on said touch sensitive display to make room for said second sub-set of keys.

The step of detecting said object comprises detecting said object for a predetermined time before displaying said first sub-set of keys.

The method may further comprise the step of continuing displaying said first sub-set of keys for a predetermined time after detection of said finger ceases.

Activating of the functions of the keys of the first set of keys, the first sub-set of keys, and the second sub-set of keys, respectively, is performed when pressing a key.

In general, the second set of sub-functions may relate hierarchically to one sub-function of said first set of sub-functions. The first set of sub-functions may relate to a first application of said mobile communication apparatus and said second set of sub-functions may relate to a second application of said mobile communication apparatus. The first set of sub-functions may be application dependent. The first sub-set of keys associated with a first set of sub-functions of said one key may comprise a first group of keys associated with sub-functions related to a first application, and a second group of keys associated with sub-functions related to a second application. The second set of sub-functions may be application dependent. The second sub-set of keys associated with a second set of sub-functions of said one key of said first sub-set of keys may comprise a first group of keys associated with sub-functions related to a first application, and a second group of keys associated with sub-functions related to a second application. The sub-functions may comprise alphanumeric input, mediaplayer input, short-cuts to applications, functions or contacts, or browser input, or any combination thereof.

The advantages of the second aspect of the present invention are essentially the same as of the first aspect of the present invention.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of embodiments of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 2-8 illustrate examples according to different embodiments of the present invention;

DETAILED DESCRIPTION OF PREFERRED EMBODIMENTS

Figure 1:
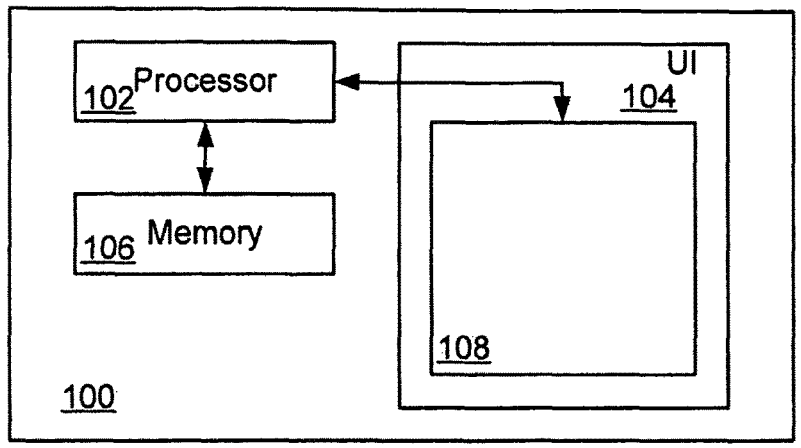
FIG. 1 is a schematic view of functional blocks of the present invention.

FIG. 1 schematically shows a mobile communication apparatus 100 according to an embodiment of the present invention. It should be noted that parts not contributing to the core of the invention are left out not to obscure the features of the present invention. The mobile communication apparatus comprises a processor 102, a user interface (UI) 104, and a memory 106. The memory 106 holds, among other things, program code for operation of applications of the mobile communication apparatus. The memory 106 also holds data used by the applications. Here, the memory 106 is depicted as a single unit. However, the memory can be two or more units, and/or divided in partitions. The processor 102 is arranged to control functions of the mobile communication apparatus 100 via connections between elements 104, 106, and 108 the control of the elements, which connections also depict signal transfer and information exchange. The mobile communication apparatus 100 can further comprise a transceiver (not shown) connected to the processor 102 which is arranged to receive and transmit radio signals through an antenna (not shown). The mobile communication apparatus can further comprise a rotating dial, a microphone, a speaker, and a buzzer. These elements are not shown in FIG. 1 not to obscure the core of the present invention. Further miscellaneous electronics, such as means for infrared data association, Bluetooth, wireless local area network, etc. can also be comprised. In particular, embodiments of the present invention relate to the special features of the UI 104, which comprises a touch sensitive display 108 which is arranged to display information which is controlled and provided by the processor 102, and to detect and provide input information to the processor 102. The touch sensitive display 108 is arranged to detect both if a part of the display 108 is pressed, e.g. by a user's finger, and if an object, e.g. said finger, is held over a part of the display 108. The detection of the state where the object is held over a part of the display can be performed in one or more ways, e.g. capacitively detecting the object close to, i.e. hoovering over, the display, light touch of the screen, which can be performed by determining the force from the object against the display, etc. The detection of pressing the part of the display is performed as conventional for touch sensitive displays.

The display 108 is arranged to display a touch keypad, i.e. a displayed image of a keypad where the areas of the display 108 where the keys of the displayed image of the keypad is mapped to, with aid of the ability of the touch sensitive display 108 to detect actuation by touching and/or pressing of the display 108, which is used to operate the mobile communication apparatus 100.

The features and function of the UI 104 are illustrated by a number of examples and embodiments with reference to FIGS. 2 to 8. However, it should be noted that, due to the large number of possible use cases within the scope of the present invention, that alternatives to and combinations of the presented examples and embodiments are equally possible.

Figures 2A, 2B:
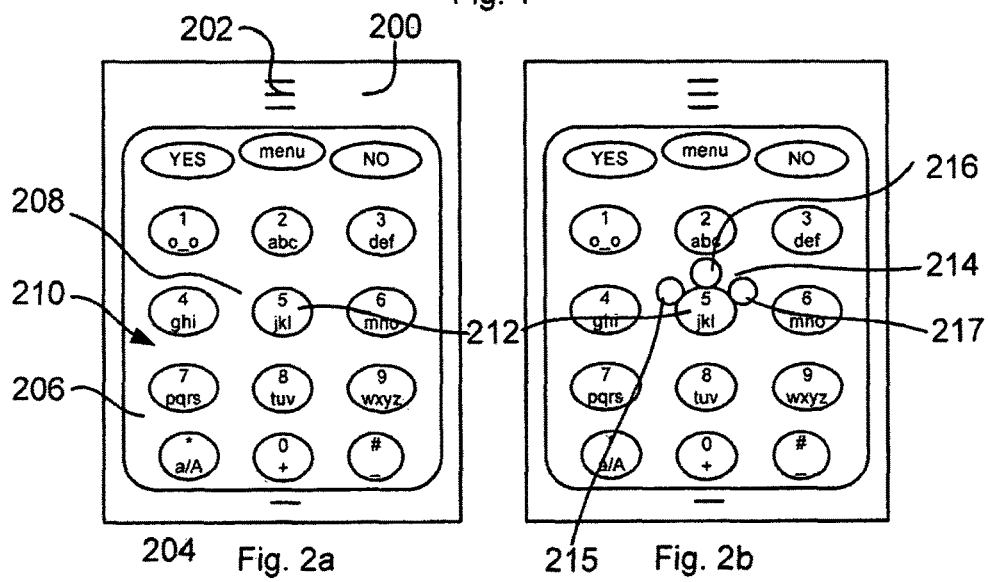

FIG. 2a illustrates a mobile communication apparatus 200 comprising a speaker 202, a microphone 204, and a touch sensitive display 206. The mobile communication apparatus 200 can also comprise a large number of elements that are commonly used in mobile communication apparatuses, as discussed with reference to FIG. 1, but these are not depicted in FIG. 2a, as well as in the below discussed figures, not to obscure the essence of the present invention. The touch sensitive display 206 displays an image of a keypad 208 comprising a set of keys 210. When the touch sensitive display 206 detects an object, which can be a finger, a stylus, or a digitizer pen, over e.g. key 212 having the main function of input of the digit "5", which normally also comprise the letters "j", "k", and "l", or other symbols or strokes for languages not using latin characters, a sub-set of keys 214 are displayed, as depicted in FIG. 2b, adjacent to the key 212. In this example, the input functions of the letters "j", "k", and "l" can be associated with the keys 215, 216, 217, respectively, of the sub-set of keys 214. Alternatively, the keys can comprise symbols related to functions of other applications, e.g. "<<", ">", "||" and ">>" for "fast reverse", "play", "pause", and "fast forward", respectively, for a media player. Other examples, such as " ", " ", and "" for "back", "forward", and "home" for a browser application, " ", " ", " ", and " " for "send", "delete", "save", and "map" for a messaging application, etc. are possible. The user can then press the one of the keys 215, 216, 217 to activate the desired function.

Figures 3A, 3B:
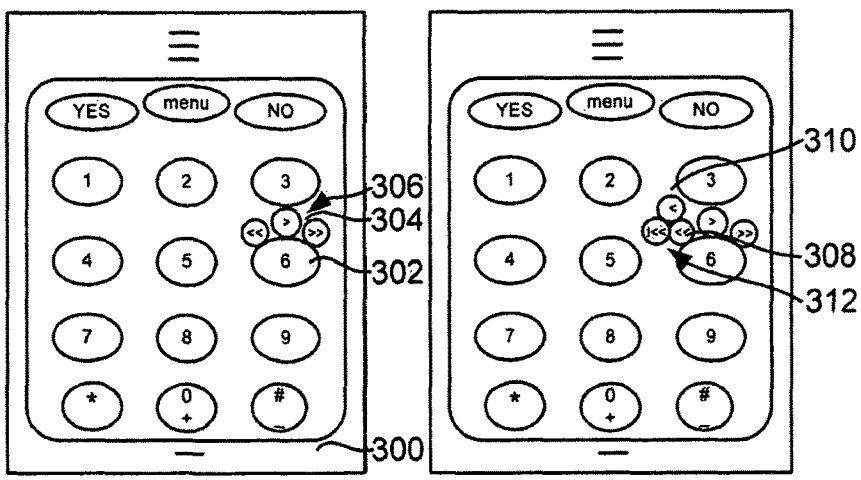

FIG. 3a illustrates a mobile communication apparatus 300 where an object, e.g. a finger, a stylus, or a digitizer pen, has been detected over a key 302, whereby a sub-set of keys 304 has been displayed adjacent to the key 302. The keys 306 of the sub-set of keys 304 can, as illustrated by the symbols "<<", ">", and ">>" which commonly on at least consumer products mean "backward", "forward", and "fast forward", respectively, be associated with a media player, an FM radio, a browser, or any other application where forward and backward navigation are provided, e.g. controlling listening to a voice mail. These applications can sometimes provide more features than only "backward", "forward", and "fast forward", e.g. search functions, step to next or previous track/album/frequency band/etc. Therefore, as depicted in the example of FIG. 3b, by detecting the object over key 308 of the sub-set of keys 304, a second sub-set of keys 310 is displayed adjacent to the key 308 of the first sub-set of keys 304, comprising keys 312 with, as illustrated by the symbols "<<", and "<", which can mean "search/step backward", and "(play) backward", respectively.

In the examples discussed herein, one or two levels of sub-sets of keys and associated sets of sub-functions have been illustrated. However, the number of levels according to the present invention is not limited. On the other hand, the number of levels are in practice limited, since the user interface and its display, and the need for a large number of levels are limited, and the usability of the mobile communication apparatus has to be considered.

To cope with limited space on the display of the mobile communication apparatus, neighbouring keys to the actual key, i.e. the key over which the object has been detected, can be moved and/or resized to make room for the additional sub-sets of keys. This is possible, since the keypad is an image provided on the touch sensitive display, and thus can a new image of an adapted keypad be provided, and the mapping of the positions of the keys on the display and the areas related to the touch sensitive function of the display are re-mapped to the new image. Examples of this are depicted in FIGS. 4 to 8.

In FIG. 4, an object, e.g. a finger, a stylus, or a digitizer pen, has been detected over a key 400, whereby a sub-set of keys 402 has been displayed adjacent to the key 400. To make room for the sub-set of keys 402, a neighbouring key 404 has been scaled down in size.

In FIG. 5, an object, e.g. a finger, a stylus, or a digitizer pen, has been detected over a key 500, whereby a sub-set of keys 502 has been displayed adjacent to the key 500. To make room for the sub-set of keys 502, a neighbouring key 504 has been moved. In this case the neighbouring key 504 has been moved upwards, away from the sub-set of keys 502.

In a preferred embodiment, the actual key, i.e. the key over which the object has been detected, always remain in the same position, such that the user experience the position of the object as the static point around which the surroundings change. This is to avoid that the key under the object, e.g. the finger, moves away, which would degrade usability. Thus, the actual key remains the same, while neighbouring keys can change positions and sizes. It is also possible to entirely remove one or more neighbouring keys, if that is considered to improve the user interface.

In FIG. 6a, an object, e.g. a finger, a stylus, or a digitizer pen, has been detected over a key 600, whereby a sub-set of keys 602 has been displayed adjacent to the key 600. To make room for the sub-set of keys 602, a neighbouring key 604 has been both scaled down in size and moved. In this example, the sub-functions of the sub-set of keys 602 are associated to contacts, e.g. in a phone book. Here, the three first names in the phone book for each of the letters "j", "k", and "l", present on the key 600 are presented as keys 604 of the sub-set of keys. In this context, "first names" could be construed to be either in alphabetical order, in a user defined order, or an order based on statistics, i.e. calling history. Here, the user can either press one of the keys 604 to access the contact, e.g. call or send a message to the contact, or hold the object over one key 606 of the keys 604 to get a second sub-set of keys 608, as depicted in FIG. 6b. In FIG. 6b, it can also be noted that the keys 604 of the first sub-set of keys 602 except the key 606 also are included in the "neighbouring keys" discussed with reference to FIGS. 4, 5, and 6a above. It can also be noted that a plurality of keys 610-614 has been moved and/or scaled down in size.

In FIG. 7, an object, e.g. a finger, a stylus, or a digitizer pen, has been detected over a key 700, whereby a sub-set of keys 702 has been displayed adjacent to the key 700. To make room for the sub-set of keys 702, a neighbouring key 704 has been scaled down in size. The sub-set of keys 702 comprises two groups 706, 708 of keys, each group 706, 708 being associated to separate types of inputs, where the first group 706, as illustrated by the symbols "<<", ">", and ">>" which commonly on at least consumer products mean "backward", "forward", and "fast forward", respectively, is associated with a media player, an FM radio, a browser, or any other application where forward and backward navigation are provided, e.g. controlling listening to a voice mail, and the second group 708 is associated with the letters "j", "k", and "l", which could be any other symbols or strokes for languages not using latin characters, and functions and applications related to them, as discussed above with reference to FIGS. 2 and 6. By providing multiple groups 706, 708, with different associations, within a sub-set on a level of sub-sets, the user can directly access a larger number of functions and/or applications.

Figure 9:
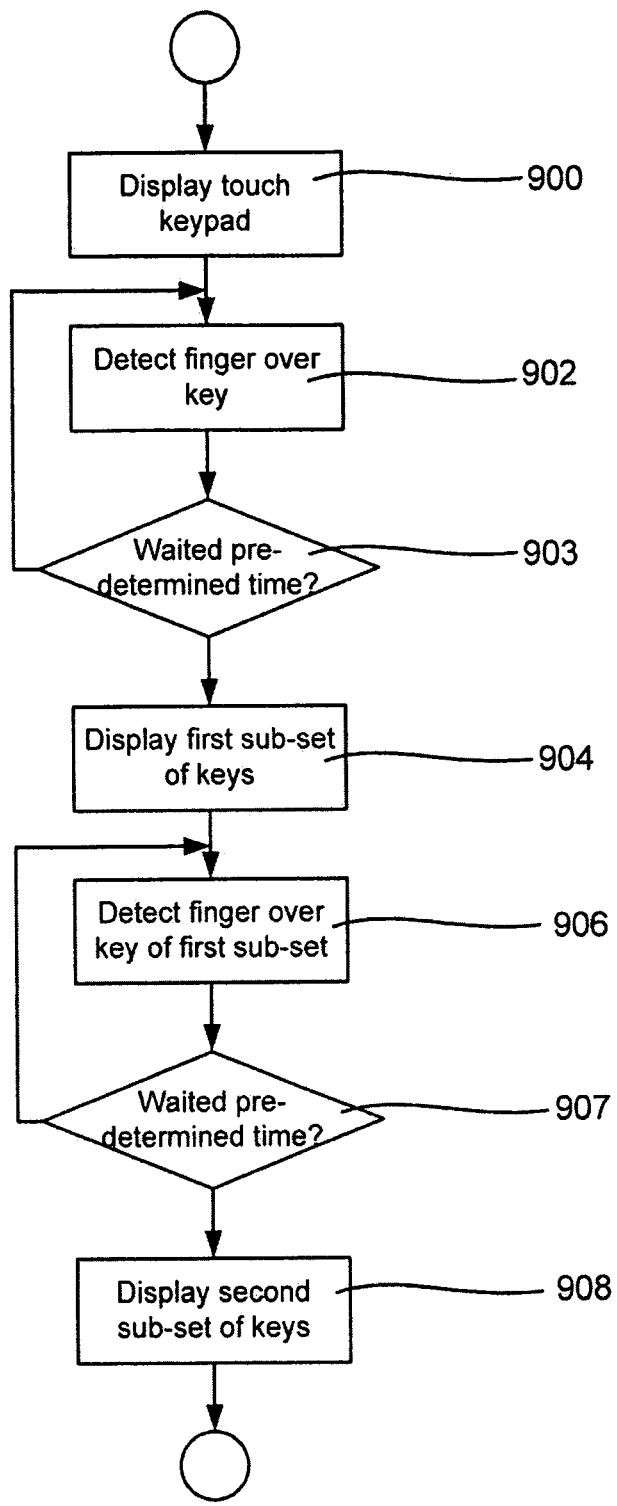
FIG. 9 is a flow chart illustrating the process according to an embodiment of the method according to the present invention.

FIG. 9 is a flow chart illustrating the method according to an embodiment of the present invention. Some steps can be performed in a different order than depicted, and some steps can be performed in parallel, as is common in real time systems. It should be noted that the features of the illustrated method are not essential for the invention unless explicitly stated. The depicted method should be considered as a most refined improvement from the essence of the invention. However, a touch keypad have to be displayed in a touch keypad displaying step 900, a finger have to be detected over a key of the touch keypad in a detection step 902, and upon detection, a first sub-set of keys has to be displayed in a first sub-set of keys displaying step 904. The touch keypad displaying step 900 comprises displaying a touch keypad, i.e. a displayed image of a keypad where the areas of the display where the keys of the displayed image of the keypad is mapped to, with aid of the ability of the touch sensitive display to detect actuation by touching and/or pressing of the display, which is used to operate the mobile communication apparatus. The detection step 902 comprises detecting an object, which can be a finger, a stylus, or a digitizer pen, over a key of a set of keys provided on the displayed touch keypad. The first sub-set of keys displaying step 904 comprises displaying a first sub-set of keys on the touch sensitive display, adjacent to the key in question in the detection step 902.

As discussed above with reference to the examples depicted in FIGS. 2 to 8, there can be provided multiple levels of sub-steps. Therefore, the method can comprise at least one step 906 for detecting the object over one of the keys of the sub-set, wherein, upon detection, a further sub-set of keys is displayed adjacent to the key in question in step 906 in a display step 908. Similar steps (not shown) are provided for each level of sub-set of keys.

Embodiments of the present invention radically improve usability of a mobile communication apparatus, and the usability is further improved by requiring that the object is detected during a predetermined time to avoid annoying and unintentional keys to show up. This is performed in a waiting step 903, where the sub-set does not show up until the object is detected for the predetermined time. Otherwise, the method returns to the detection step 902. The similar approach applies to the detection of the object over the keys of the sub-set of keys in step 906, where a similar waiting step 907 is inserted before the displaying step 908.

Similarly, it is preferable that the keys of the sub sets of keys are displayed for a certain time, not too short, not too long, before the keys are removed from the display if they are not pressed. Therefore, the displaying steps 904, 908 for the sub-sets of keys can be adapted to only show the sub-sets of keys for predetermined times, respectively.

Figure 10:
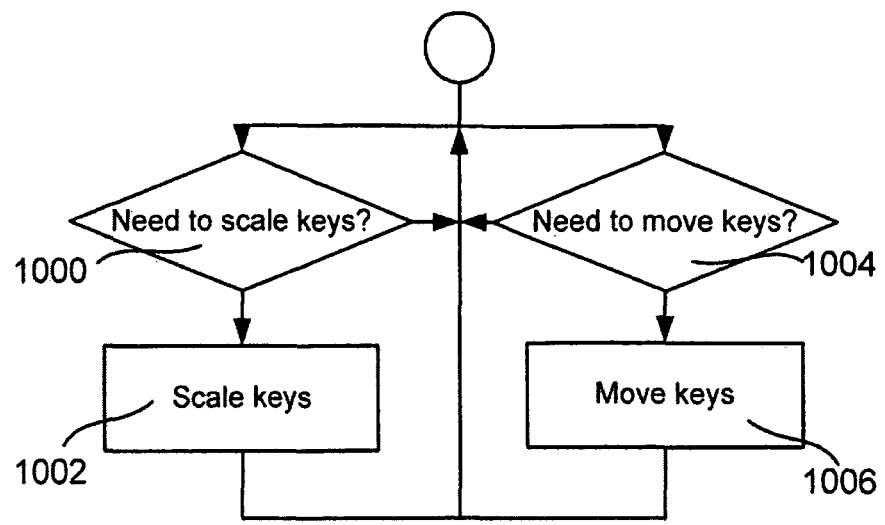
FIGS. 10 and 11 are flow charts illustrating sub-processes according to embodiments of the present invention.

FIG. 10 is a flow chart of a sub-process, preferably running in parallel to the process described with reference to FIG. 9, which copes with the available and many times limited display space. In general, the process checks if there is need for more space as the touch keypad is extended by sub-sets of keys. Therefore, the process can comprise a step for checking need for scaling the size of neighbouring keys to the key in question, as in the detection steps 902, 906 discussed above with reference to FIG. 9, as depicted by scaling check step 1000. If scaling is determined to be needed, this is performed in a neighbouring key scaling step 1002, where one or more neighbouring keys are scaled down in size. The process can also/alternatively comprise a step for checking need for moving neighbouring keys to the key in question. This is performed in a moving check step 1004, and if moving of neighbouring keys is needed, this is performed in a neighbouring key moving step 1006. The scaling and positions of the keys are preferably restored when there is no longer a need.

Figure 11:
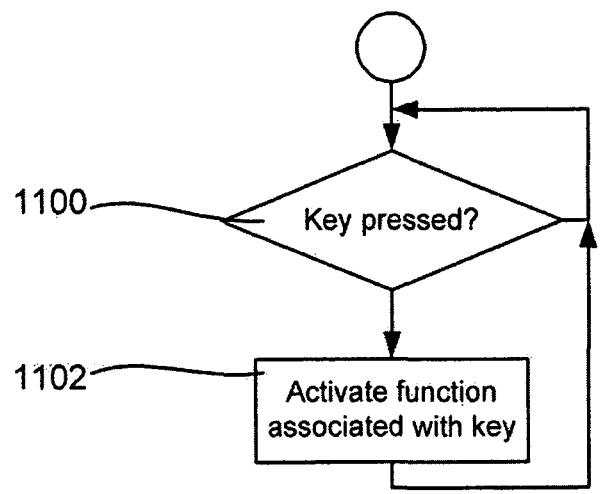

FIG. 11 is a flow chart illustrating the process of checking if any key is pressed and if it is, activating an associated function. This is performed in a conventional way and comprises a step of checking if and what key is pressed in a key press checking step 1100, and an associated function activating step 1102, and needs no further explanation.

FIG. 8 illustrates a mobile communication apparatus 800 where all of the features discussed with reference to FIGS. 2-7 are combined, and particularly that multiple of groups is used on one sub-set level, from which next level of sub-set, here associated with the key 802 with "j", being a number of contacts with names starting with the letter "J". On the other hand, FIG. 8 could also illustrate the mobile communication apparatus 800, but where the next sub-set level associated with "j", and the names "Jane", "Jens", "John", and "Juha" are names on artists, albums, songs, images, or any other media content, and thereby illustrating a further improved input method for these types of applications, where the "two groups" of keys of the first sub-set of keys just are different inputs to the same application. It should therefore be clear that the approach presented by the present invention can be combined in a multitude of ways. Thus, the invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus comprising:
   at least one processor; and
   at least one memory including computer program code, the at least one memory and the computer program code configured to, with the at least one processor, cause the apparatus at least to:
   provide for display of a touch keypad on a touch sensitive display, comprising an original set of keys, each for activating a corresponding function;
   receive an indication of an object detected at a first key of said set of keys;
   responsive to receiving the indication of said object detected at said first key for less than a predetermined time, activate a function corresponding to the first key;
   responsive to receiving the indication of said object detected at said first key for at least the predetermined time, provide for display of a first sub-set of keys associated with a first set of sub-functions of said first key, wherein said first sub-set of keys is arranged adjacent to said first key so that one or more of said first sub-set of keys is nearer to the first key and nearer to at least one other of said first sub-set of keys than to any other key in the original set of keys, and includes a second key that was not included in the original set of keys; and
   responsive to receiving an indication of an object detected at said second key, activate a sub-function corresponding to said second key;
   wherein, while the first sub-set of keys is displayed, each of the original set of keys is displayed and can activate its corresponding function.

2. The apparatus according to claim 1, wherein the at least one memory and the computer program code are further configured to, with the at least one processor, cause the apparatus to:
   receive an indication of an object detected at said second key of said first sub-set of keys; and
   responsive to receiving the indication of said object detected over said second key for at least a predetermined time, provide for display of a second sub-set of keys associated with a second set of sub-functions of said second key of said first sub-set of keys and including a third key that was not included in the first sub-set of keys; and
   responsive to receiving an indication of an object detected at said third key, activate a sub-function corresponding to said third key.

3. The apparatus according to claim 2, wherein said second set of sub-functions relates hierarchically to one sub-function of said first set of sub-functions.

4. The apparatus according to claim 2, wherein said second set of sub-functions is application dependent.

5. The apparatus according to claim 1, wherein said first set of sub-functions comprises a first group of sub-functions related to a first application of said apparatus and a second group of sub-functions related to a second application of said apparatus.

6. The apparatus according to claim 1, wherein said first set of sub-functions is application dependent.

7. The apparatus according to claim 1, wherein the at least one memory and the computer program code are configured to, with the at least one processor, cause the apparatus to provide for display of the first sub-set of keys by: maintaining the display of said first sub-set of keys for a predetermined time after the indication of an object detected at said first key has ceased.

8. The apparatus according to claim 1, wherein said sub-functions comprise alphanumeric input, media player input, short-cuts to applications, functions or contacts, or browser input, or any combination thereof.

9. The apparatus of claim 1, wherein the first sub-set of keys is displayed between the first key and one or more neighboring keys in the original set of keys.

10. The apparatus according to claim 9, wherein the at least one memory and the computer program code are further configured to, with the at least one processor, cause the apparatus to:
    provide for display of the first sub-set of keys by moving at least one neighboring key of the original set of keys relative to at least one of the other of the original set of keys on said touch sensitive display, while maintaining the first key in its previously displayed position;
    wherein the first sub-set of keys is displayed between the first key and the moved neighboring key.

11. The apparatus of claim 10, wherein the at least one memory and the computer program code are further configured to, with the at least one processor, cause the apparatus to:
    resize the at least one neighboring key to display the neighboring key at a smaller size.

12. The apparatus according to claim 9, wherein the at least one memory and the computer program code are further configured to, with the at least one processor, cause the apparatus to provide for display of the first sub-set of keys by:
    resizing at least one neighboring key of the original set of keys relative to at least one of the other of the original set of keys on said touch sensitive display to display the neighboring key at a smaller size;
    wherein the first sub-set of keys is displayed between the first key and the resized neighboring key.

13. A method comprising:
    causing a touch keypad to be displayed on a touch sensitive display comprising an original set of keys, each for activating a corresponding function;
    receiving an indication of an object detected over at a first key of said original set of keys; and
    responsive to receiving the indication of said object detected at said first key for less than a predetermined time, activating a function corresponding to said first key;
    responsive to receiving the indication of said object detected at said first key for at least the predetermined time, causing a first sub-set of keys to be displayed adjacent to said first key, wherein said first sub-set of keys is associated with a first set of sub-functions of said first key so that one or more of said first sub-set of keys is nearer to the first key and nearer to at least one other of said first sub-set of keys than to any other key in the original set of keys, and includes a second key that was not included in the original set of keys; and
    responsive to receiving an indication of an object detected at said second key, activating a sub-function corresponding to said second key;
    wherein, while the first sub-set of keys is displayed, each of the original set of keys is displayed and can activate its corresponding function.

14. The method according to claim 13, further comprising:
- receiving an indication of an object detected at said second key of said first sub-set of keys; and
- responsive to receiving the indication of said object detected at said second key of said first sub-set of keys for at least a predetermined time, causing to be displayed a second sub-set of keys associated with a second set of sub-functions of said second key of said first sub-set of keys and including a third key that was not included in the first sub-set of keys; and
- responsive to receiving an indication of an object detected at said third key, activating a sub-function corresponding to said third key.

15. The method according to claim 14, wherein said second set of sub-functions relates hierarchically to one sub-function of said first set of sub-functions.

16. The method according to claim 14, wherein said second set of sub-functions is application dependent.

17. The method according to claim 13, wherein the step of causing the first sub-set of keys to be displayed comprises:
- maintaining the display of said first sub-set of keys for a predetermined time after the indication of said object detected at said first key has ceased.

18. The method according to claim 13, wherein said first set of sub-functions comprises a first group of sub-functions related to a first application of said mobile communication apparatus and a second group of sub-functions related to a second application of said mobile communication apparatus.

19. The method according to claim 13, wherein said first set of sub-functions is application dependent.

20. The method according to claim 13, wherein said sub-functions comprise alphanumeric input, media player input, short-cuts to applications, functions or contacts, or browser input, or any combination thereof.

21. The method of claim 13, wherein the first sub-set of keys is displayed between the first key and one or more neighboring keys in the original set of keys.

22. The method according to claim 21, wherein the step of causing the first sub-set of keys to be displayed comprises:
- moving at least one neighboring key of the original set of keys relative to at least one of the other of the original set of keys on said touch sensitive display, while maintaining the first key in its previously displayed position;
- wherein the first sub-set of keys is displayed between the first key and the moved neighboring key.

23. The method of claim 22, wherein the step of causing the first sub-set of keys to be displayed further comprises:
- resizing the at least one neighboring key to display the neighboring key at a smaller size.

24. The method according to claim 21, wherein the step of causing the first sub-set of keys to be displayed comprises:
- resizing at least one neighboring key of the original set of keys relative to at least one of the other of the original set of keys on said touch sensitive display to display the neighboring key at a smaller size;
- wherein the first sub-set of keys is displayed between the first key and the resized neighboring key.

25. A computer program product comprising at least one non-transitory computer-readable storage medium having computer-readable program instructions stored therein, the computer readable program instructions configured to cause an apparatus to at least perform:
- cause a touch keypad to be displayed on a touch sensitive display comprising an original set of keys, each for activating a corresponding function;
- receive an indication of an object detected at a first key of said original set of keys;
- responsive to receiving the indication of said object detected at said first key for less than a predetermined time, activate a function corresponding to said first key;
- responsive to receiving the indication of said object detected at said first key for at least the predetermined time, cause a first sub-set of keys to be displayed adjacent to said first key, wherein said first sub-set of keys is associated with a first set of sub-functions of said first key so that one or more of said first sub-set of keys is nearer to the first key and nearer to at least one other of said first sub-set of keys than to any other key in the original set of keys, and includes a second key that was not included in the original set of keys; and
- responsive to receiving an indication of an object detected at said second key, activate a sub-function corresponding to said second key;
- wherein, while the first sub-set of keys is displayed, each of the original set of keys is displayed and can activate its corresponding function.

26. A computer program product according to claim 25, wherein the computer readable program instructions are further configured to cause the apparatus to:
- receive an indication of an object detected at said second key of said first sub-set of keys; and
- responsive to receiving an indication of said object detected at said second key of said first sub-set of keys for at least a predetermined time, cause to be displayed a second sub-set of keys associated with a second set of sub-functions of said second key of said first sub-set of keys and including a third key that was not included in the first sub-set of keys; and
- responsive to receiving an indication of an object detected at said third key, activating a sub-function corresponding to said third key.

27. The computer program product according to claim 25, wherein the first sub-set of keys is displayed between the first key and one or more neighboring keys in the original set of keys.

* * * * *